United States Patent [19]

Wauer et al.

[11] 4,367,891
[45] Jan. 11, 1983

[54] INDUSTRIAL ROBOT WITH A GRIPPING MECHANISM

[75] Inventors: Gerd Wauer; Dietmar Becker; Rubi Schönthaler, all of Kaiserslautern, Fed. Rep. of Germany

[73] Assignee: Pfaff Industriemaschinen GmbH, Fed. Rep. of Germany

[21] Appl. No.: 41,622

[22] Filed: May 23, 1979

[30] Foreign Application Priority Data

May 30, 1978 [DE] Fed. Rep. of Germany ....... 2823584

[51] Int. Cl.³ .................... B25B 1/00; B25B 1/24; B25B 5/16
[52] U.S. Cl. .................... 294/88; 294/104; 414/739; 414/729; 269/266
[58] Field of Search ......... 294/88, 106, 99 R, DIG. 2, 294/104; 414/739, 729, 744 A, 753, 741; 269/287, 266

[56] References Cited

U.S. PATENT DOCUMENTS

| 2,800,867 | 7/1957 | Smith | 269/287 |
|---|---|---|---|
| 2,875,913 | 3/1957 | Gohrke | 294/88 |
| 3,139,302 | 6/1964 | Orloff | 294/106 |
| 3,165,348 | 1/1965 | Keskitalo | 294/106 |
| 3,436,071 | 4/1969 | Petrucelli | 269/266 |
| 3,927,424 | 12/1975 | Itoh | 294/106 |
| 3,945,676 | 3/1976 | Asamoto | 294/106 |
| 4,200,272 | 4/1980 | Godding | 269/266 |

FOREIGN PATENT DOCUMENTS

| 2642963 | 4/1977 | Fed. Rep. of Germany | 269/266 |
|---|---|---|---|
| 551235 | 5/1977 | U.S.S.R. | 294/DIG. 2 |
| 626947 | 8/1978 | U.S.S.R. | 294/DIG. 2 |
| 647228 | 2/1979 | U.S.S.R. | 294/DIG. 2 |

*Primary Examiner*—Robert B. Reeves
*Assistant Examiner*—Brian Bond
*Attorney, Agent, or Firm*—McGlew and Tuttle

[57] ABSTRACT

An industrial robot for gripping workpieces of diverse shape comprises at least one finger preferably two arranged for pivotal movement on respective sides of the workpiece. Each finger has at least one workpiece engagement member or joint which is movable thereon. Fluid pressure operated means are connected to the workpiece engagement member or joint so that it is moved outwardly from the associated finger to engage the workpiece and to be locked in the engaged position so that it will reengage in the same position after the finger is shifted relative to the workpiece to reengage it.

4 Claims, 11 Drawing Figures

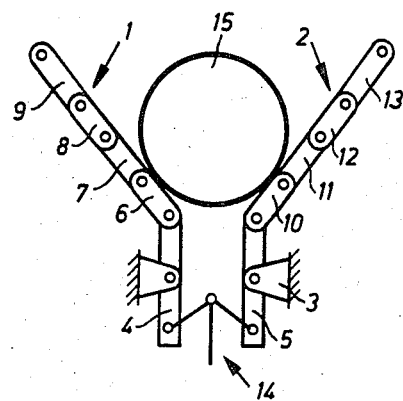
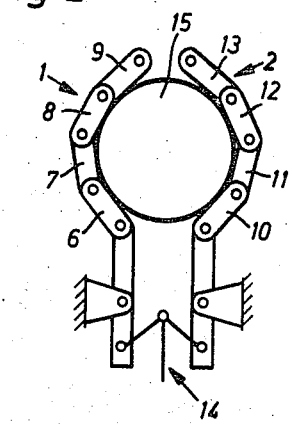
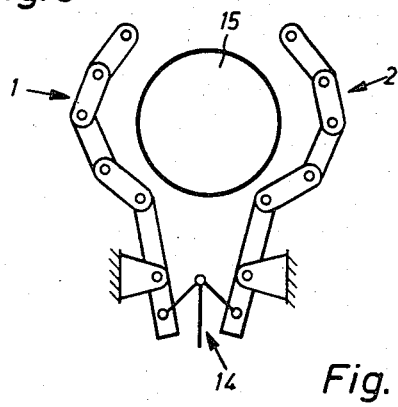
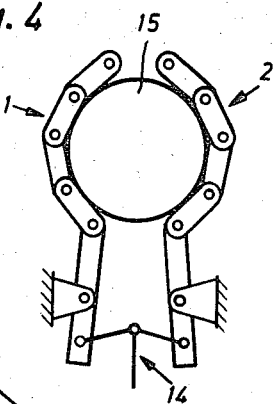
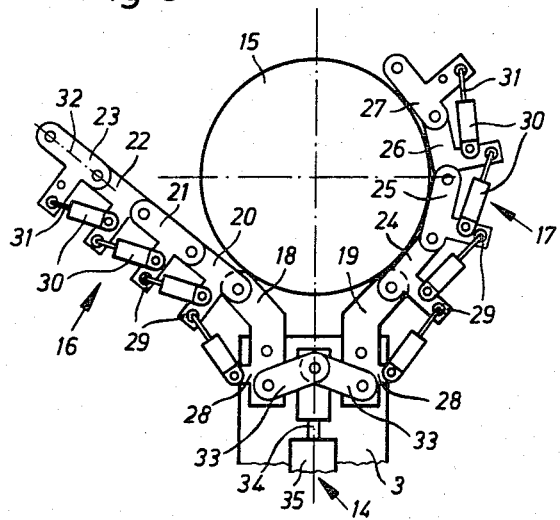
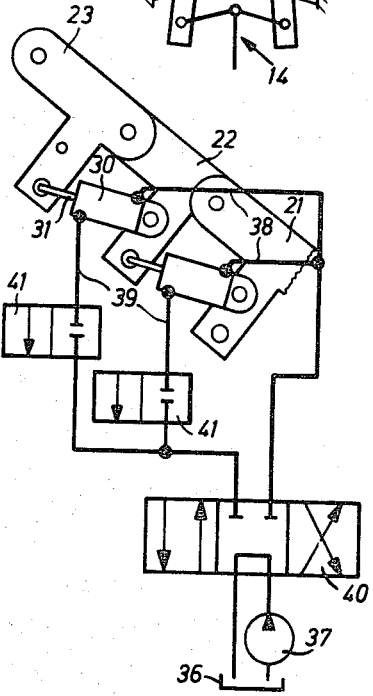

INDUSTRIAL ROBOT WITH A GRIPPING MECHANISM

FIELD AND BACKGROUND OF THE INVENTION

This invention relates in general to the construction of automatic devices and in particular to a new and useful industrial robot having a gripping mechanism for gripping workpieces of diverse configurations.

The invention concerns a gripping mechanism on an industrial robot for individual workpieces of different type and small series of identical workpieces of any shape. The gripping mechanism comprises at least two pivotally mounted fingers which have several gripping elements moving relative to each other. In a first workpiece of a series, the gripping elements are pressed on the surface of the workpiece and locked in a gripping position for the entire handling period of all workpieces of this series, so that the fingers from rigid gripping surfaces adapted form-locking to the workpieces for the following gripping operations. The opening and closing of the gripping mechanism, with the gripping elements locked, is effected by turning the levers in opposite direction by means of a lever mechanism.

DESCRIPTION OF THE PRIOR ART

The gripping mechanisms frequently used in industrial robots with two or more pivotally arranged rigid fingers, which have a substantially plane gripping surface, are not suitable for gripping irregularly shaped workpieces since there is only point contact between the fingers and the workpiece, because of the generally different shape of the surface of the workpiece and the gripping surface of the fingers. If a workpiece is only held at a few points, this results in a high surface pressure so that the workpiece can be damaged. In addition, a workpiece held only at a few points can easily slip or tilt inside the gripping mechanism.

The journal "Foerdern und Heben", (translatable as Handling and Lifting) 1976, No. 13, part mht, discloses a gripping mechanism which has exchangeable shaping jaws that are adapted to the shape of irregular workpieces. Since rigid jaws or fingers adapted to the shape of a workpiece can only be used for workpieces which always have the same shape, slight deviations from the shape of the workpiece required specially adapted new jaws or fingers. In view of the wide range of different workpieces, this requires a correspondingly great number of specially produced jaws or fingers. With only a slight difference in the shape of the workpieces, there is a risk that similarly looking jaws or fingers will be mixed up. Since the resetting time required for a change of workpieces is mostly longer than the rest of the resetting time of the industrial robot, gripping mechanisms with rigid jaws or fingers are only suitable for large series of workpieces.

The journal "Foerdern und Heben", 1978, No. 1, p. 41, discloses a gripping mechanism which has two fingers, each having several articulated members. The fingers can be moved into an opening or closing position by wires which are conducted over rollers arranged at the joints of the members. In the open position of the fingers, the members are uncoiled to the outside. When the fingers close, the members designed as gripping elements bear successively on the surface of the workpiece, and the fingers adapt themselves to a great extent to the shape of the workpiece, insuring a firm grip. Since the members of the fingers are turned with each closing or gripping movement from the opening position, which always remains the same, to the closing or gripping position, which depends on the shape of the workpiece, workpieces of any shape with a different surface form can be engaged without resetting. Since the members are turned successively during the closing and opening of the fingers, the opening and closing in this gripping mechanism takes relatively longer than in gripping mechanisms with rigid jaws which are only turned about a single axis. This inconvenience does not manifest itself in individual differently shaped workpieces, since the slow closing and opening of the fingers still takes less time than the resetting of a gripping mechanism. But with smaller, and even more so with larger series of identical workpieces, the slower closing and opening movements of the fingers, compared to a gripping mechanism with rigid fingers, results in a considerable loss of time, so that this gripping mechanism is not suitable for series of identical workpieces.

SUMMARY OF THE INVENTION

The invention provides a gripping mechanism where the gripping elements adapt themselves rapidly to the shape of the workpiece to be engaged, where the closing and opening of the fingers takes place in the shortest possible time.

In accordance with the invention there is provided an industrial robot for gripping workpieces of diverse shape which includes at least one finger and preferably two which are mounted for pivotal movement and which for example may be shifted to engage around a workpiece by means of a toggle mechanism. Each finger includes a plurality of finger joints or engagement members which are movable from the finger to engage against the workpiece. This is accomplished by pressure means which is connected to the movable member to move it into engagement with the workpiece and lock it into the engaged position so that it will permit gripping by the fingers when the fingers are moved against the workpiece.

Since the gripping elements can be moved into the gripping position independent of each other, they can therefore be pressed simultaneously on the surface of the workpiece to be handled, so that the fingers can adapt themselves in the shortest possible time to the shape of the workpiece. After the adaptation, the mutual relative position of the gripping elements is locked by clamping means, so that the fingers together with the gripping elements, which are now locked in a gripping position, form the rigid gripping jaws adapted to the workpiece. If, after the first workpiece, a second workpiece is to be engaged, which is identical in size and shape, the gripping elements remain locked in gripping position, which is also adapted to the second workpiece. The opening and closing of the gripping mechanism is effected in this case solely by moving the fingers in an opposite direction, which can be effected for example, by a toggle lever drive. Since each finger is only turned about one axis and performs only a single movement, the time required for opening and closing the gripping mechanism depends only on the speed of the toggle sleeve drive, so that the shortest possible opening and closing times can be achieved on the basis of the gripping principle.

Since each finger of the gripping mechanism has several gripping elements, the fingers can be adapted to any shape of a workpiece, so that even irregularly shaped workpieces can be engaged slip and tilt-proof without damage. Furthermore, since both the adaptation of gripping elements to a new workpiece, which is different in shape or size or both from the preceding workpiece, and the closing and opening of the fingers can be carried out in the shortest possible time with the gripping elements locked in gripping position, the gripping mechanism according to the invention can be used with advantage both for engaging individual workpieces of different shape and for engaging several successively appearing identical workpieces.

Since the fingers of the stripping mechanism form rigid gripping jaws, after the gripping elements have been locked, much greater gripping forces can be exerted in this state, similar to the one-piece gripping jaws, than with fingers having several gripping elements, where the gripping elements are not locked.

According to another feature of the invention, a hydraulic cylinder is assigned to each member in a gripping mechanism, where the fingers consist of members forming the gripping elements which are articulated with each other at their ends. This hydraulic cylinder which bears in the first member of a finger on the arm of the industrial robot carrying the gripping mechanism, and in the other members on the respective preceding member. The piston rods of the cylinders are hinged laterally of the longitudinal axis of the associated member, for example, on an extension, so that they exert a torque on the corresponding member when the cylinder is actuated. When all cylinders are admitted at the same time, all members are therefore turned simultaneously into a gripping or opening position. As clamping means in the feed-and/or return lines of the hydraulic cylinders are provided, for example, non-return valves, which lock the mutual relative position of the members in a locking position, due to the incompressibility of the hydraulic fluid. A principally different possibility of locking the members consists in making the junctions between two members each lockable, for example, by shiftable couplings arranged in the joints.

According to another feature of the invention, the fingers are formed each by a lever, and the gripping elements comprise pins arranged in the lever for transverse displacement, whose end face remote of the gripping surface can be admitted with a pressure medium and whose axial position can be locked by clamping means. When the pins are admitted with the pressure medium, they are at the same time, but independent of each other, pressed on the surface of the workpiece to be engaged. After the pins have been locked in their mutual relative position, the fingers form, in this case, rigid gripping jaws adapted to the shape of the workpiece, whose gripping geometry is maintained until a workpiece different in size and/or shape requires a new adaptation of the relative position of the pins.

According to another feature, the clamping means provided for the pins are formed each by an axially displaceable adapter sleeve provided with a cone and an annular extension, which can be moved into a clamping or opening position by admitting the end faces of the extension. A return spring acting on each pin has the effect that the pins are returned into their starting position, after the adapter sleeves have been loosened.

According to another feature, each finger has a plurality of closely juxtaposed and superposed pins which protrude with their end face remote of the stripping surface into a common pressure chamber. Due to the close arrangement of a plurality of pins, a practically real, true-to shape adaptation of the finger to the shape of the workpiece can be achieved. Since the pressure can generally be reduced when engaging irregularly shaped workpieces with an increase of the form-locking force of the gripping tools, a gripping mechanism with such fingers can be used particularly for engaging pressure-sensitive workpieces. In such a bunched arrangement of the pins, the latter can be clamped in a simple manner in a gripping position so that the pins are received in bearing plates arranged in a mutual distance and provided with guide bores, of which one can be turned relative to the other.

An embodiment is also suggested when the gripping elements are formed by pins, and the clamping elements by adapter sleeves, but where the adapter sleeves are held by spring force in their closed position, and only the opening of the adapter sleeves is effected by the application of a pressure medium. In this way, the pins remain reliably locked in gripping position over a long period of time, even if leakages should appear in the pipe line of the pressure medium or in sealed areas.

Accordingly it is an object of the invention to provide an industrial robot for gripping workpieces of diverse shape and dimensions which comprises at least one finger which is mounted for pivotal movement and it has at least one workpiece engagement member which is movable on the finger and which is connected to means which permits the movement thereof to adjust to the configuration of the workpiece and to lock it in an adjusted position.

A further object of the invention is to provide an industrial robot for engaging objects of diverse size and configuration which comprises at least one gripping finger having a plurality of pivotally interconnected joints with mounting means pivotally supporting at least one of the joints and means such as a fluid pressure operated extensible and retractable drive means pivotally interconnected between the adjacent joints for pivoting the joint so it engages around a respective part of the object and for putting it under a pressure after engagement so that it will maintain its same engagement position.

A further object of the invention is to provide an industrial robot which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a symbolically represented side elevational view of gripping mechanism with two fingers, each having several gripping elements or joints which are in a starting position and constructed in accordance with the invention;

FIG. 2 is an elevational view of the gripping mechanism represented in FIG. 1, where the gripping elements are in gripping position;

FIG. 3 shows the gripping mechanism represented in FIG. 1, where the gripping elements are locked in a relative position adapted to the shape of the workpiece, and where the now rigid fingers are in opening position.

FIG. 4 shows the gripping mechanism represented in FIG. 1, where the gripping elements are locked and the fingers are in closing position;

FIG. 5 is a gripping mechanism where the fingers consist of articulated members, to each of which is assigned a hydraulic cylinder;

FIG. 6 is a view similar to FIG. 5 indicating a part of a hydraulic circuit diagram;

GENERAL DESCRIPTION OF THE PREFERRED EMBODIMENTS

Figure 7:
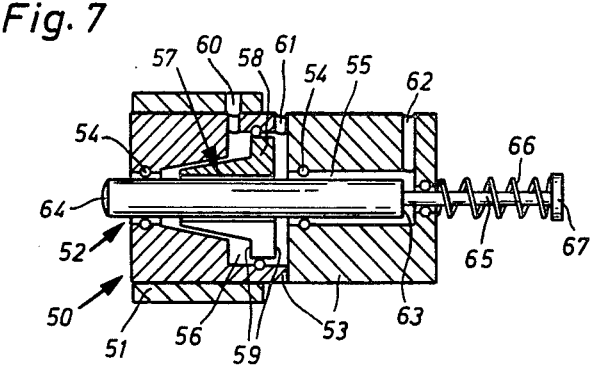
FIG. 7 is a sectional view of a second embodiment of a gripping mechanism, where the gripping elements are formed by pins.

Referring to the drawings in particular, the invention embodied therein in FIGS. 1 to 6 comprises an industrial robot for engaging objects of diverse size and configuration which comprises at least one and in the embodiment shown two gripping fingers 1 and 2 which have a plurality of pivotally interconnected joints or workpiece engaging members which are positioned relatively so as to engage around the object and held in a position after engagement by pressure operated means which are extensible and retractable to effect the movement of the joints.

The gripping mechanism, represented symbolically in FIGS. 1 to 4, has two fingers 1, 2 having a plurality of pivotally interconnected joints including a first joint or lever 4 or 5 pivotally mounted on mounting means or an arm 3, of the industrial robot, and four additional joints or gripping elements 6, 7, 8 and 9 and 10, 11, 12 and 13 respectively. The gripping elements 6 to 13 are formed by members which are articulated with each other in the manner of a sprocket chain. The two levers 4, 5 are connected to drive means in the form of a toggle lever drive 14 for turning the levers 4, 5 and thus fingers 1, 2 in respective directions. For locking gripping elements 6 to 13 in the gripping position adapted to a workpiece 15 (FIG. 2), either the actuating drives associated with the individual gripping elements, or the gripping elements themselves can be locked or clamped, in the manner described in the various examples.

In the first embodiment shown in FIG. 5, the gripping mechanism has two fingers 16, 17 arranged on arm 3 of the industrial robot. Each finger 16 or 17 comprises a lever or joint 18 or 19 mounted on arm 3, and of four members or joints 20 to 23 and 24 to 27 respectively serving as gripping elements for workpiece 15, which are articulated with each other in the manner of a sprocket chain. On each lever 18, 19 is arranged a laterally projecting extension 28 and on each member 20 to 27 an extension 29. A fluid pressure operated drive means, in the form of a hydraulic cylinder 30, is assigned to each member 20 to 27 as an actuating drive in such a way that the hydraulic cylinder 30 bearing on a certain member, for example 23, bears on extension 29 of the preceding member 22, and that piston rod 31 acts on extension 29 of the associated member 23. In this case, both hydraulic cylinder 30 and piston rod 31 are hinged laterally of the longitudinal axis 32 of the two members 22, 23. In order to obtain a torque on member 23, it would suffice, however, if only the fulcrum of hydraulic cylinder 30, or only the fulcrum of piston rod 31 were laterally of the longitudinal axis 32 of member 22 or 23. The hydraulic cylinders 30 associated with the first members 20 or 24 of the fingers 16, 17 are arranged on extension 28 of lever 18 or 19. A guide rod 33 acts on each lever 18 or 19 and the guide rods 33 are connected to piston rod 34 of a pressure cylinder 35 arranged on arm 3, and form with it toggle lever drive 14. The members 20 to 23 of finger 15 represented in FIG. 5 are shown in starting position, and the members 24 to 27 of FIG. 17 are shown in gripping position.

The circuit diagram represented in FIG. 6 shows only the part of the hydraulic driving and switching elements which are determinant for members 22, 23, which are in a locked position. The hydraulic actuating drive for all members 20 to 27 comprises a collecting tank 36 for the hydraulic fluid, a pump 37, several feed lines 38 to the hydraulic cylinders 30, several return lines 39, and a directional control valve 40 which can be actuated electromagnetically. For locking the mutual relative position of members 20 to 27, non-return valves 41, which can likewise be actuated electromagnetically, are arranged in return line 39.

In the second embodiment represented in FIG. 7, only a part of a holding joint or finger 50 of a gripping mechanism is shown. Finger 50 comprises a lever 51 and several juxtaposed or superposed gripping elements formed by pins 52. Lever 51, just like levers 18, 19 of the first embodiment, is arranged on arm 3 and connected with toggle lever drive 14. Each pin 52 is axially displaceable in a guide bore 55 sealed by sealing rings 54 in a two-part housing 53, as seen in FIG. 7, there arranged in lever 51. In the left part of housing 53 is provided a chamber 56 which is conically tapered at one end. In chamber 56, a slotted adapter sleeve 57 is arranged surrounding pin 52. Adapter sleeve 57 is conical at one end and carries an annular extension 58 at the other end. At both sides of end faces 59 of extension 58, a pressure medium feeds 60 and 61 open into chamber 56. Another pressure medium feed 62 is assigned to the right end face 63 of pin 52, as seen in FIG. 7, which is opposite gripping surface 64 which will come into contact with the workpiece (not shown). On end face 63, there is secured a thin pin 65, leading out of housing 53, which carries a compression spring 66 and, at its free end, a collar 67.

Figure 8:
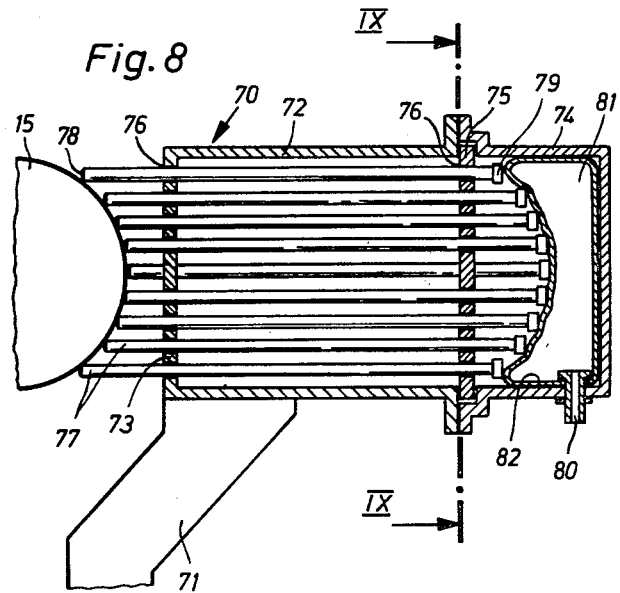
FIG. 8 is a sectional view of a third embodiment of a gripping mechanism.
Figure 9:
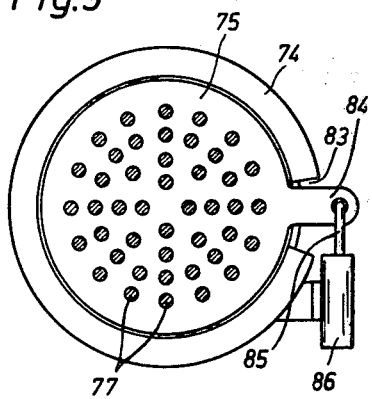
FIG. 9 is a sectional view of the gripping mechanism along line IX—IX of FIG. 8.

The third embodiment represented in FIGS. 8 and 9 shows likewise only a part of a finger 70 of a gripping mechanism. Finger 70 has a lever 71 which, like levers 18, 19 of the first embodiment is arranged on arm 3 and is connected with toggle lever drive 14. Lever 71 carries a housing 72 which is closed at one end by a stationary bearing plate 73 and at the other end by a pot-shaped cover 74. In cover 74 is arranged a rotary bearing plate 75. In both bearing plates 73, 75 are provided a number of guide bores 76, in which are arranged axially displaceable pins 77 acting as gripping elements. The end face of pins 77 cooperating with workpiece 15 forms a gripping surface 78. At the other end of pins 77 is arranged a collar 79. Pins 77 protrude with their collar 79 into cover 74, which is provided with a pressure medium feed 80, that forms a pressure chamber 81. In cover 74, is arranged a diaphragm bladder 82 is arranged which tightly seals pressure chamber 81 on all sides. On bearing plate 75 is arranged an arm 84 protruding through an opening 83 in cover 74 which is connected to piston rod 85 of a pressure cylinder 86 secured on cover 74.

In the fourth embodiment represented in FIG. 10, again only a part of a finger 90 of a gripping mechanism is shown. Finger 90 consists of a lever 91 and of several juxtaposed or superposed gripping elements formed by cylindrical pins 92. Lever 91 is arranged, just like levers 18, 19 of the first embodiment, on arm 3 and connected to toggle lever drive 14. To each pin 92, there is assigned a housing 93, secured in lever 91, which is closed at one end with a bearing plate 94 and at the other end with a pot-shaped cover 95. Pin 92 is received for axial displacement in a guide bore of bearing plate 94 and housing 93. A chamber 96, is provided in housing 93. The chamber 96 is conically tapered at one end. In chamber 96, a slotted adapter sleeve 97 is arranged surrounding pin 92 which carries at one end an annular extension 98 with two end faces 99, 100. In chamber 96 is also arranged a compression spring 101 which bears at one end on bearing plate 94 and at the other end on end face 99 and keeps adapter sleeve 97 normally in a closed position, locking the axial position of pin 92. For opening adapter sleeve 97, there are provided three pin-type pistons 102 cooperating with end face 100, which are received each in a guide bore 103. Guide bores 103 are joined with each other by a ring chamber 104 into which opens a pressure medium feed 105. The gripping surface of pin 92 coming in contact with the workpiece (not shown) is designated with 106. At the opposite end of pin 92 is provided a collar 107. A compression spring 108 arranged in cover 95 presses pin 92, with adapter sleeve 97 open, in the direction of a workpiece and thus into a gripping position.

MODE OF OPERATION

Before engaging the first workpieces of a series of workpieces of the same size and shape, gripping elements 6 to 9 and 10 to 13 of the gripping mechanism shown in FIGS. 1 to 4 are in the starting position represented in FIG. 1. With toggle lever drive 14 remaining in rest position, gripping elements 6 to 13 are pressed simultaneously on the surface of workpiece 15. As soon as gripping elements 6 to 13 bear on the surface of workpiece 15 and are thus in the gripping position represented in FIG. 2, adapted largely to the shape of workpiece 15. The relative position of the gripping elements is locked by clamping means so that fingers 1, 2 form, with gripping elements 6 to 9 and 10 to 13 which are now immovable relative to each other, rigid gripping jaws adapted to workpiece 15. For opening the gripping mechanism, fingers 1, 2 are spread by means of toggle lever drive 14 in the manner shown in FIG. 3, with gripping elements 6 to 9 and 10 to 13 maintaining their locked relative position. For engaging the next workpiece, which is identical in shape and size with the previously engaged workpiece 15, fingers 1, 2 are turned by means of toggle lever drive 14 into the closing position represented in FIG. 4, and the second workpiece 15 is engaged. Since fingers 1, 2 of the gripping mechanism form rigid gripping jaws after gripping elements 6 to 13 are locked, much higher gripping forces can be exerted, as a comparison with FIGS. 2 and 4 shows, similar to the one-piece rigid gripping jaws, than with unlocked gripping elements 6 to 13, which can therefore move relative to each other.

If individual workpieces of different shape or size or both are to be engaged instead of series of identical workpieces the locking of gripping elements 6 to 13 in gripping position can be eliminated, after adaptation of locking elements 6 to 13, so that the gripping force is exerted in this case solely by the actuating drives performing the adaptation movement of gripping elements 6 to 13. But if heavy pieces are to be engaged, it is advisable, even with constantly changing shapes of workpieces, to lock gripping elements 6 to 13 after each adaptation, because the gripping force can then be greatly increased by means of toggle lever drive 14.

In the first embodiment represented in FIGS. 5 and 6, the adaptation of members 20 to 23 and 24 to 27 to the shape of workpiece 15 is effected by admitting hydraulic cylinder 30 with hydraulic fluid. To this end, directional control valve 40 is switched into a position where the hydraulic fluid supplied by pump 37 can flow into feed lines 38 of hydraulic cylinders 30. All non-return valves 41 are in flow direction. As soon as members 20 to 27 have been adapted to the shape of workpiece 15 and are therefore in gripping position, all non-return valves 41 are switched into the locking position shown in FIG. 6 and directional control valve 40 is switched into the central position, likewise shown in FIG. 6, after which members 20 to 23 and 24 to 27 are locked in gripping position due to the incompressibility of the hydraulic fluid. The spreading and closing of the now rigid fingers 16, 17 is effected by toggle lever drive 14, whose pressure cylinder 35 turns levers 18, 19 in opposite direction over guide rods 33.

In the second embodiment represented in FIG. 7, the adaptation of pin 52 to the shape of a workpiece is effected by admitting the pressure medium feed lines 60 and 62 with pressure medium, after which adapter sleeve 57 is pushed into opening position and pin 52 is pressed on the surface of the workpiece to be engaged. Then the admission of pressure medium feed 60 is stopped, and instead pressure medium feed 61 is admitted with pressure medium, so that adapter sleeve 57 is pushed into the closing position. In this way, the axial position of pin 52, determined by the shape and size of the workpiece, is locked, after which the admission of the pressure medium feed 62 can be stopped, while pressure medium feed 61 must remain admitted at long as pin 52 remains in locked position. In the same manner as described for pin 52 in FIG. 7, the other pins (not shown) of finger 50 and also the pins of the second and third finger (if provided) of the gripping mechanisms are adapted to the shape of the workpiece to be engaged and locked in gripping position, so that finger 50, as well as the second and third finger form rigid gripping jaws adapted to the shape of the workpiece. The spreading and closing of finger 50 and of the other figures is effected in the above-described manner by means of toggle lever drive 14.

In the third embodiment represented in FIGS. 1, 8 and 9, the adaptation of pin 77 to the shape of workpiece 15 is effected by admitting pressure chamber 81 with a pressure medium, so that pins 77 are pressed on the surface of workpiece 15 over diaphragm 82. As soon as pins are adapted to the shape of the workpiece and are therefore in gripping position, bearing plate 75 is turned by means of pressure cylinder 86 so far relative to fixed bearing plate 73 that pins 77 are clamped between the two bearing plates 73, 75. This way the mutual relative position or gripping position of pins 77 can be locked, after which finger 70 and the second finger (now shown) of the gripping mechanism form rigid gripping jaws adapted to the shape of the workpiece. The spreading and closing of finger 70 and of the second finger are effected in the above-described manner by means of toggle lever drive 14.

Figure 11:
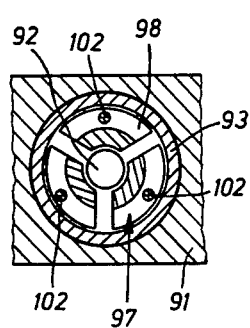
FIG. 11 shows a sectional view of the gripping mechanism along line XI—XI of FIG. 10.
Figure 10:
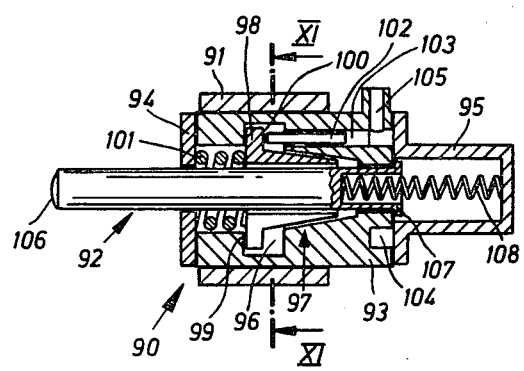
FIG. 10 is a sectional view of a fourth embodiment of a gripping mechanism.

In the fourth embodiment represented in FIGS. 10 and 11, adapter sleeve 97 is pushed by means of pin-type piston 102 into the opening position before pin 92 is adapted to th shape of a workpiece by admitting pressure medium feed 105 with a pressure medium. Since the locking of pin 92, effected by adapter sleeve 97 and compression spring 101 is thus eliminated, compression spring 108 presses pin 92 into an advanced starting position in the direction of the workpiece to be engaged. This requires that finger 90 and the other fingers of the gripping mechanism (not shown) are already moved by toggle lever drive 14 into a spreading position during the adaptation of pin 92 to the shape of the workpiece. The adaptation proper is effected in this way that finger 90, together with the other fingers, is moved simultaneously by means of toggle lever drive 14 into a closing position. Pin 92, retracting against the action of compression spring 108, adapts itself to the shape of the workpiece. Then the admission of pressure medium feed 105 is stopped, after which compression spring 101 presses adapter sleeve 97 into closing position, thus locking the axial position of pin 92. In the same manner, the other pins (not shown) of finger 90, and also the pins of the second or third finger of the gripping mechanism are adapted to the shape of the workpiece and locked in gripping position, so that finger 90, as well as the second and third finger, if any, form rigid gripping jaws adapted to the shape of the workpiece. The spreading and closing of the now rigid finger 90 and of the other fingers is effected in the above-described manner by means of toggle lever drive 14.

While specific embodiments of the invention have been shown and described in detail to illustrate the application of the principles of the invention, it will be understood that the invention may be embodied otherwise without departing from such principles.

What is claimed is:

1. A gripping mechanism, for an industrial robot, for gripping workpieces of diverse configuration comprising at least two gripping fingers pivotally mounted on the robot, each of said gripping fingers having a plurality of workpiece engagement members movable thereon, means for moving said gripping fingers between an open position out of engagement with a workpiece and an engagement position in which said fingers grip a workpiece, means acting on each of said workpiece engagement members for moving each of said workpiece engagement members of each finger into adjusted positions in which said finger conforms to the configuration of the workpiece to be gripped, clamping means for locking each of said workpiece engagement members of each finger relative to each other in the adjusted positions, said moving means being operable to move each of said gripping fingers with said workpiece engagement members locked in said adjusted positions, and wherein each of said gripping fingers comprises a series of said workpiece engagement members successively hinged together, and said means acting on each of said workpiece engagement members comprises a fluid pressure operated piston and cylinder connected between adjacent engagement members to pivot said engagement members relatively to engage around the workpiece to be gripped.

2. A gripping mechanism according to claim 1, wherein said moving means comprises lever members pivotably mounted on the robot, said gripping fingers being pivotally mounted on said lever members, and a toggle mechanism connected to said lever members to move said lever member to shift said fingers toward and away from the workpiece to be gripped.

3. In an industrial robot, a gripping mechanism for engaging objects of diverse size and configuration, comprising a plurality of gripping fingers, each gripping finger having a plurality of pivotally interconnected joints, means for pivotally connecting at least one of said joints of each finger to the robot to position each finger, and fluid pressure operated extensible and retractable drive means pivotally connected between adjacent joints operable to pivot and engage said joints relative to each other around the object to be engaged for holding said joints under pressure relative to each other in a fixed gripping position for releasing said joints and for pivoting said joints relative to each other, and means for moving said gripping fingers relative to each other with said joints in the fixed object gripping each other position.

4. An industrial robot according to claim 3, wherein said at least one gripping finger comprises a gripping finger adapted to be positioned on each side of the object to be engaged, said mounting means pivotally mounting each of said gripping fingers, said fluid pressure operated means comprising a piston and cylinder combination hingedly connected between adjacent ones of said joints, said connecting means comprising a lever member interconnecting the robot and at least one of said joints, and a toggle mechanism connected to said lever member to shift said lever member toward and away from the object.

* * * * *